US011022634B1

(12) United States Patent
Lee et al.

(10) Patent No.: US 11,022,634 B1
(45) Date of Patent: Jun. 1, 2021

(54) RAIL BLOCK CONTEXT GENERATION FOR BLOCK-LEVEL RAIL VOLTAGE DROP ANALYSIS

(71) Applicant: Synopsys, Inc., Mountain View, CA (US)

(72) Inventors: Mu-Shun Lee, Taipei (TW); Yang-Ming Chen, Taipei (TW); Youxin Gao, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/847,335

(22) Filed: Apr. 13, 2020

Related U.S. Application Data

(60) Provisional application No. 62/832,563, filed on Apr. 11, 2019.

(51) Int. Cl.
*G01R 19/165* (2006.01)
*G01R 31/40* (2020.01)
*G01R 19/00* (2006.01)

(52) U.S. Cl.
CPC ... *G01R 19/16571* (2013.01); *G01R 19/0084* (2013.01); *G01R 19/16523* (2013.01); *G01R 31/40* (2013.01)

(58) Field of Classification Search
CPC .......... G01R 19/16571; G01R 19/0084; G01R 19/16523; G01R 31/40
USPC ........................................................ 340/657
See application file for complete search history.

(56) References Cited

U.S. PATENT DOCUMENTS

| | | | | |
|---|---|---|---|---|
| 6,868,374 B1* | 3/2005 | Ditlow | ................. | G06F 30/367 703/18 |
| 7,802,217 B1* | 9/2010 | Gopinath | ................ | G06F 30/39 716/109 |
| 2002/0073380 A1* | 6/2002 | Cooke | ..................... | G06F 30/30 716/102 |
| 2006/0095872 A1* | 5/2006 | McElvain | ............. | G06F 30/394 716/113 |
| 2008/0127020 A1* | 5/2008 | Rittman | ................ | G06F 30/367 716/51 |
| 2008/0250364 A1* | 10/2008 | Chilwal | ................ | G06F 30/367 716/109 |
| 2010/0153893 A1* | 6/2010 | Bartolotti | ............. | G06F 30/327 716/107 |
| 2012/0215516 A1* | 8/2012 | Lau | ........................ | G06F 30/367 703/16 |

(Continued)

*Primary Examiner* — Kerri L McNally
(74) *Attorney, Agent, or Firm* — Sterne, Kessler, Goldstein & Fox P.L.L.C.

(57) ABSTRACT

A system is disclosed that includes a memory and a processor to perform operations, including analyzing rail voltage drop for a full-chip to identify an IR drop violation in a block design of the full-chip. The operations include performing a block-level rail voltage drop analysis for the block design and generating a revised block design corresponding to the block design in which the IR drop violation is identified. The operations include performing a block-level rail voltage drop analysis on the revised block design to verify that the IR drop violation is fixed and integrating the revised block design into the full-chip to replace the block design upon verifying that the IR drop violation is fixed. The operations include performing the rail voltage drop analysis for the full-chip comprising the revised block design.

20 Claims, 9 Drawing Sheets

(56) References Cited

U.S. PATENT DOCUMENTS

| | | | | |
|---|---|---|---|---|
| 2014/0181771 A1* | 6/2014 | Sajid | .................... | G06F 30/367 |
| | | | | 716/113 |
| 2014/0359551 A1* | 12/2014 | Schaefer | ............... | G06F 30/367 |
| | | | | 716/136 |
| 2014/0372823 A1* | 12/2014 | Dimri | .............. | G01R 31/31726 |
| | | | | 714/731 |
| 2015/0212152 A1* | 7/2015 | Agarwal | .......... | G01R 31/31707 |
| | | | | 714/731 |
| 2017/0061064 A1* | 3/2017 | Wang | .................... | G06F 30/398 |
| 2019/0164889 A1* | 5/2019 | Biswas | ................ | G06F 30/398 |

* cited by examiner

RAIL BLOCK CONTEXT GENERATION FOR BLOCK-LEVEL RAIL VOLTAGE DROP ANALYSIS

CROSS-REFERENCE TO RELATED APPLICATIONS

The present application claims the benefit under 35 U.S.C. § 119(e) of U.S. Provisional Patent Application No. 62/832,563 filed on Apr. 11, 2019, which is incorporated herein by reference in its entirety for all purposes.

TECHNICAL FIELD

This disclosure has significance in the field of electronic design automation in general, including the following topics: power distribution analysis for VLSI circuits using compact lumped RC models.

BACKGROUND

VLSI circuits are designed using hierarchical design flow, in which a task of the VLSI circuit design, for example, for a full-chip, is divided into a number of small tasks of block design, which is also known as a block. Designers can independently work on their assigned blocks and in parallel form RTL through physical implementations. Even though the hierarchical design flow has many benefits to offer to VLSI design, a major issue with the hierarchical design flow is an analysis of the rail voltage drop (IR drop), how to fix the voltage drop issue in the block designs, and validate the fix. In traditional validation flow, designers fix the issues inside their assigned blocks and then analyze the fix with the rail voltage analysis for the full-chip. Due to the size and the complexity of the VLSI circuit design, the full-chip analysis for the IR drop is a very lengthy time-consuming process and hard to execute by the block designers.

DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to obtain a block context model for a block such that an analysis result similar to full-chip can be achieved. The following terms used in this disclosure are explained below.

Block—a specified function unit formed with a group of VLSI circuits.

Block-context—a characterized physical and electrical model to represent circumstances outside the block.

Instance—an instantiation of the block.

Region Searching—a method to search target objects in a specified region.

Rail Analysis—an analysis framework to analyze the reliability of power and ground network (power integrity).

Bounding Box of Resistance—a bounding box of the shape that extracts the resistance for the rail analysis.

Figure 1:
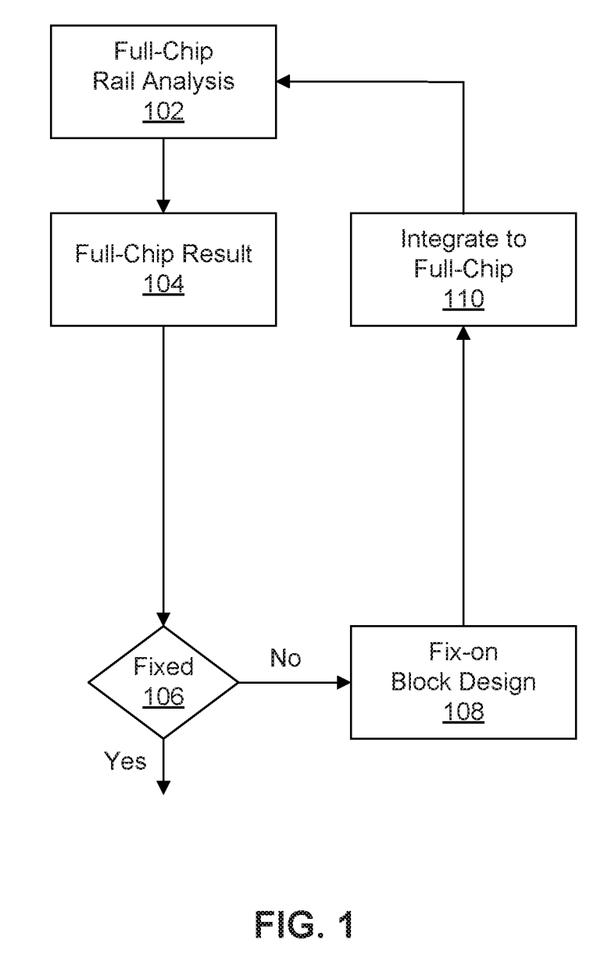
FIG. 1 illustrates traditional full-chip IR-drop fixing flow.

In modern VLSI circuit design using the hierarchical design flow, block designs or blocks are generally reused. Designers of the blocks of a VLSI circuit design are not the same as designers of the top-level design of the VLSI circuit design. In the VLSI circuit design, power integrity is crucial since excessive rail voltage drop (IR drop) and ground bounce may cause timing problems, and excessive current may cause chip failure due to electromigration and thermal effects. To avoid chip failure and other issues, as shown in FIG. 1, at step 102, the designer performs signoff-rail analysis to ensure that no power-related issue is present because IR drop on the data path cells may affect setup timing. Similarly, IR drop on the clock cells may affect setup timing as well as hold timing-related issues. In the signoff-rail analysis, all block designs are integrated and flattened for analysis. During the signoff-rail analysis, the robustness of the power grid is analyzed in static IR drop mode of operation. In the static IR drop mode of operation, the average electrical current drawn from the power grid over one clock cycle may be computed. The power grid may generally be on the top metal layers of the full-chip, whereas the blocks may be on the middle and/or lower metal layers. Strategic drop downs or taps from the top layers into the middle and/or lower metal layers power the blocks.

At step 104, the designer may review or analyze the results of the full-chip rail analysis. While reviewing the full-chip rail analysis results, the worst IR drop violations for each block may be noted to be fixed later. For example, IR drop violations may include one-sided power delivery, which may generate areas of high resistance. At step 106, based on the review, if it is determined that one or more hotspots affecting power integrity exist in the block design, as shown by step 108, the designer opens the block design to fix the hotspot. For example, the designer may add a wider power ground (PG) straps to improve the current conductivity. At step 110, the designer integrates the fixed block into the full-chip, and the full-chip rail analysis performed at step 102 needs to be repeated to validate that no hotspot exists in the block design. The designer may need to re-execute full-chip rail analysis to validate that the problem has been corrected. However, the full-chip rail analysis is a costly and very time-consuming process; it makes the whole fixing cycle very long and hard to converge the issue within a limited time.

Figure 2:
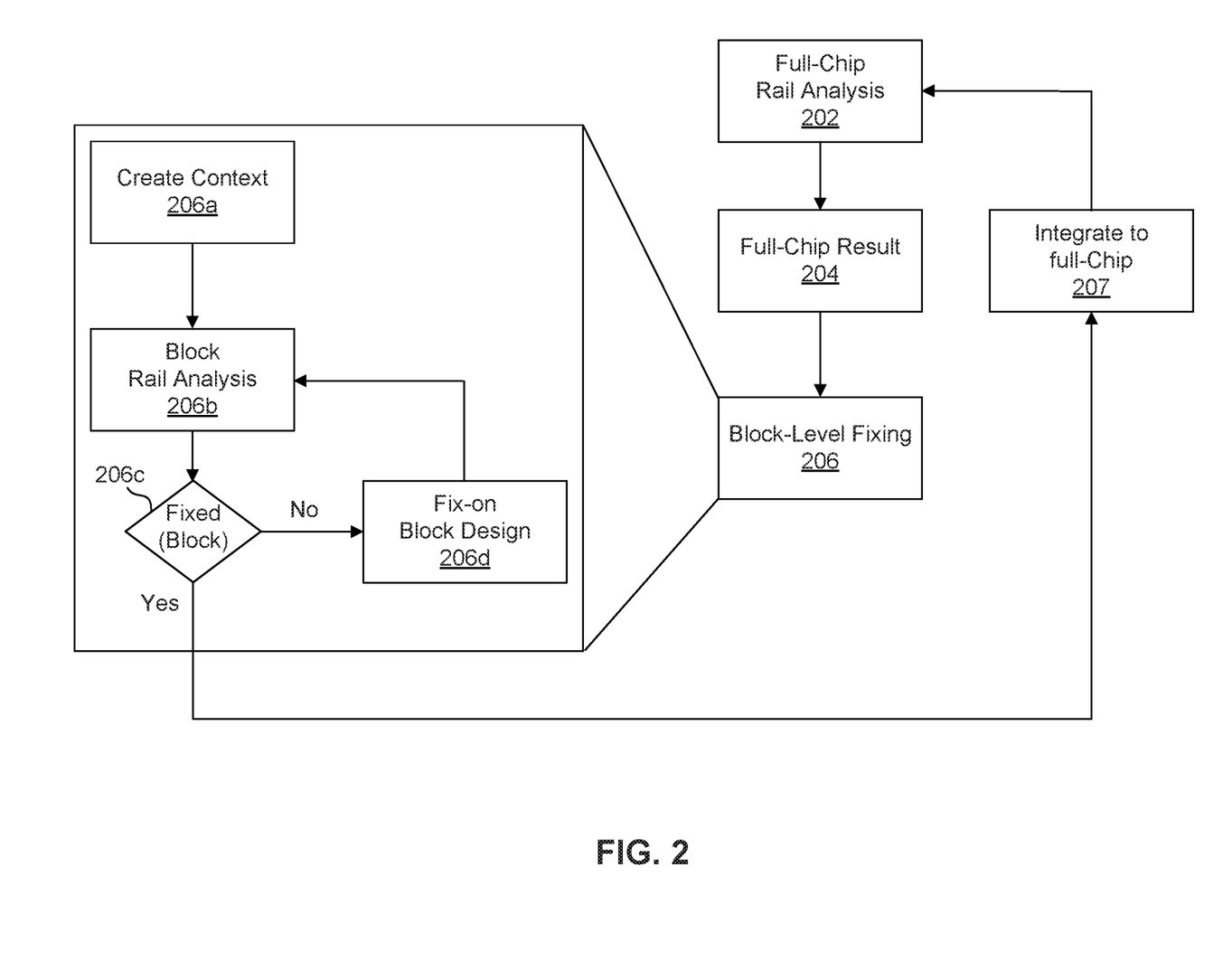
FIG. 2 illustrates a context-aware block design IR-drop fixing flow according to an exemplary aspect of the present disclosure.

FIG. 2 illustrates a context-aware block design IR-drop fixing flow according to an exemplary aspect of the present disclosure. In some aspects, a hierarchical IR drop analysis flow is proposed, which includes creation of block-contexts and block analysis with the created block-contexts. The hierarchical IR drop analysis flow can let designers use block analysis with the created block-contexts to obtain full-chip analysis results faster in comparison to the full-chip IR drop analysis performed as described above with reference to FIG. 1.

The block-context is a characterized physical and electrical model to represent the circumstances outside the block. The block-context thus includes physical and electrical contexts. The physical context includes locations of connections between the block and its parent block. This location is called the "tap" location. The tap location is used to connect an external voltage source and the block design in the block-level IR drop analysis.

As shown in FIG. 2, in accordance with some aspects, at step 202, similar to step 102, the designer may perform signoff-rail analysis to identify power integrity related issues by performing IR drop analysis in the static IR drop mode. At step 204, the full-chip IR drop analysis result is reviewed according to step 104, as described above with reference to FIG. 1.

At step 206, for each block identified having power integrity related issues, block-level fixing is performed. For fixing IR drop violations within a block, at step 206a, block-context is created so that circumstances outside the block may be simulated in determining how the circumstances outside the block may affect the IR drop within the block. At step 206b, IR drop analysis for the block may be performed with the created block-context. Since IR drop analysis for the block is performed using the created block-context that affects IR drop violations within the block, the proposed method may be described as context-aware block design IR drop fixing flow. At step 206c, the results of the block-level IR drop analysis may be reviewed to determine whether any issues affecting power integrity are present within the block. If no issue affecting power integrity is found within the block, then the block may be integrated into the full-chip at step 207. However, if an IR drop violation is still present within the block, then at step 206d, the IR drop violations within the block, as determined at step 206c, are fixed as described above with reference to step 108. After the IR drop violations within the block are fixed, a revised block is generated corresponding to the block, where the IR drop violation is fixed in the revised block. The IR drop analysis at the block-level with the created context may be performed again according to step 206b to verify that the IR drop violations in the revised block are actually fixed. Steps 206b, 206c, and 206d are repeated until all IR drop violations within the block and/or the revised block are fixed. Step 206, 206a, 206b, 206c, and 206d may be repeated for each block and/or the revised block, as described above, and then integrated into the full-chip at step 207.

After one or more blocks having power integrity related issues are cured and integrated into the full-chip, full-chip IR drop analysis according to step 202 may be performed again to ensure that no issues adversely affecting the power integrity of the full-chip are present. Since IR drop violations within each block are fixed and validated by performing IR drop analysis at the block-level, which is comparatively a much smaller circuit unit; the entire process as described with reference to FIG. 2 is much faster compared to the process as described with reference to FIG. 1 because the full-chip IR drop analysis is required for less number of times for the context-aware block design IR drop fixing flow.

Figure 3:
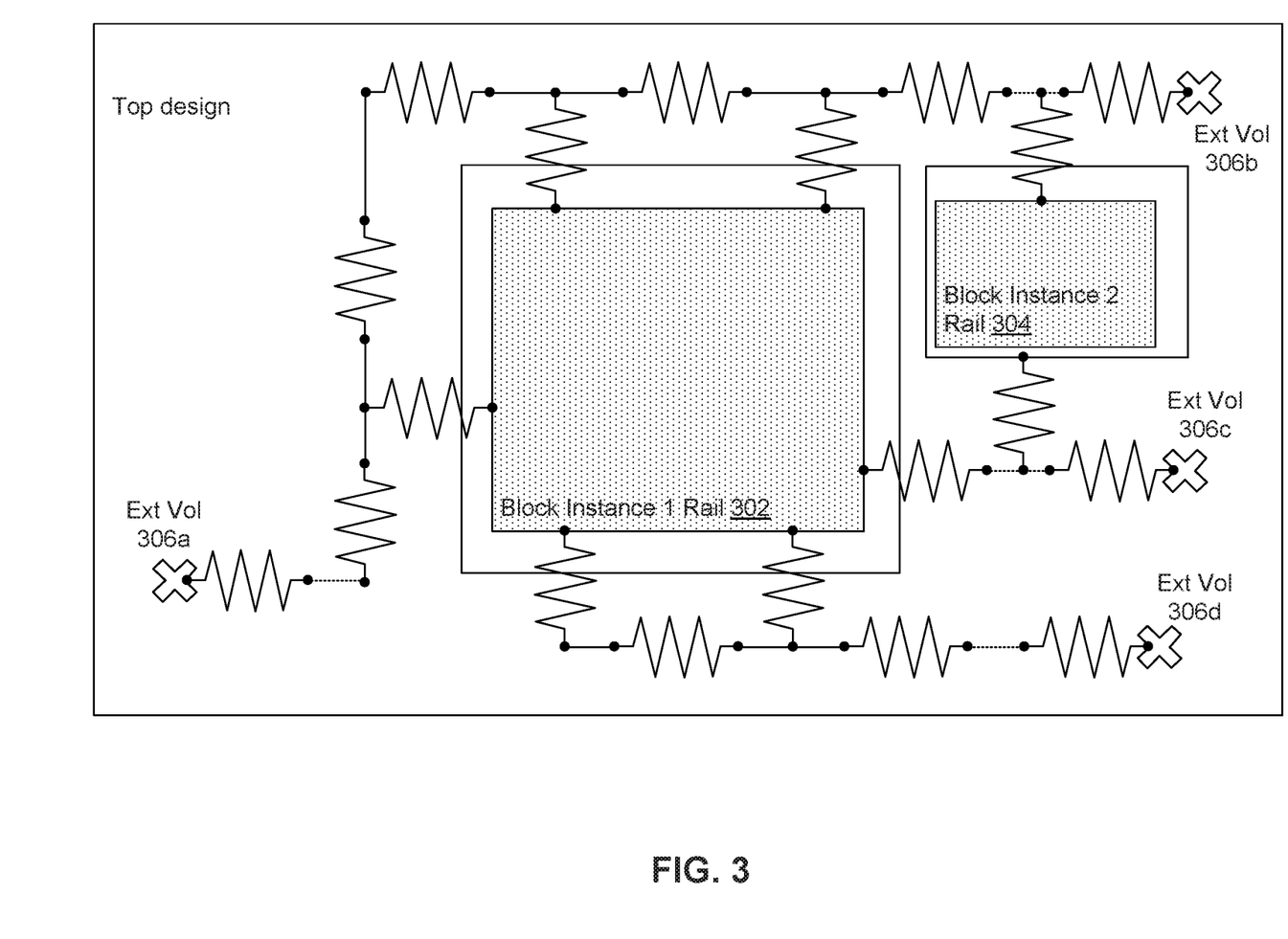
FIG. 3 illustrates an example of a resistance network of supply nets after IR-drop analysis according to an exemplary aspect of the present disclosure.

FIG. 3 illustrates an example of a resistance network of supply nets during IR-drop analysis according to an exemplary aspect of the present disclosure. The supply nets provide power to the blocks, for example, a first instance of a block block-instance-1 302 and a second instance of the block block-instance-2 304, from one or more external voltage source, for example, as shown in FIGS. 3 as 306a, 306b, 306c, and 306d. Though only two instances of the block 302 and 304 are shown in FIG. 3, there may be more than or less than two instances of the block in the chip. As described above, the power grid network or supply nets are on top metal layers of the chip and may provide power to the block instances, which are in the middle or lower metal layers.

Figure 4:
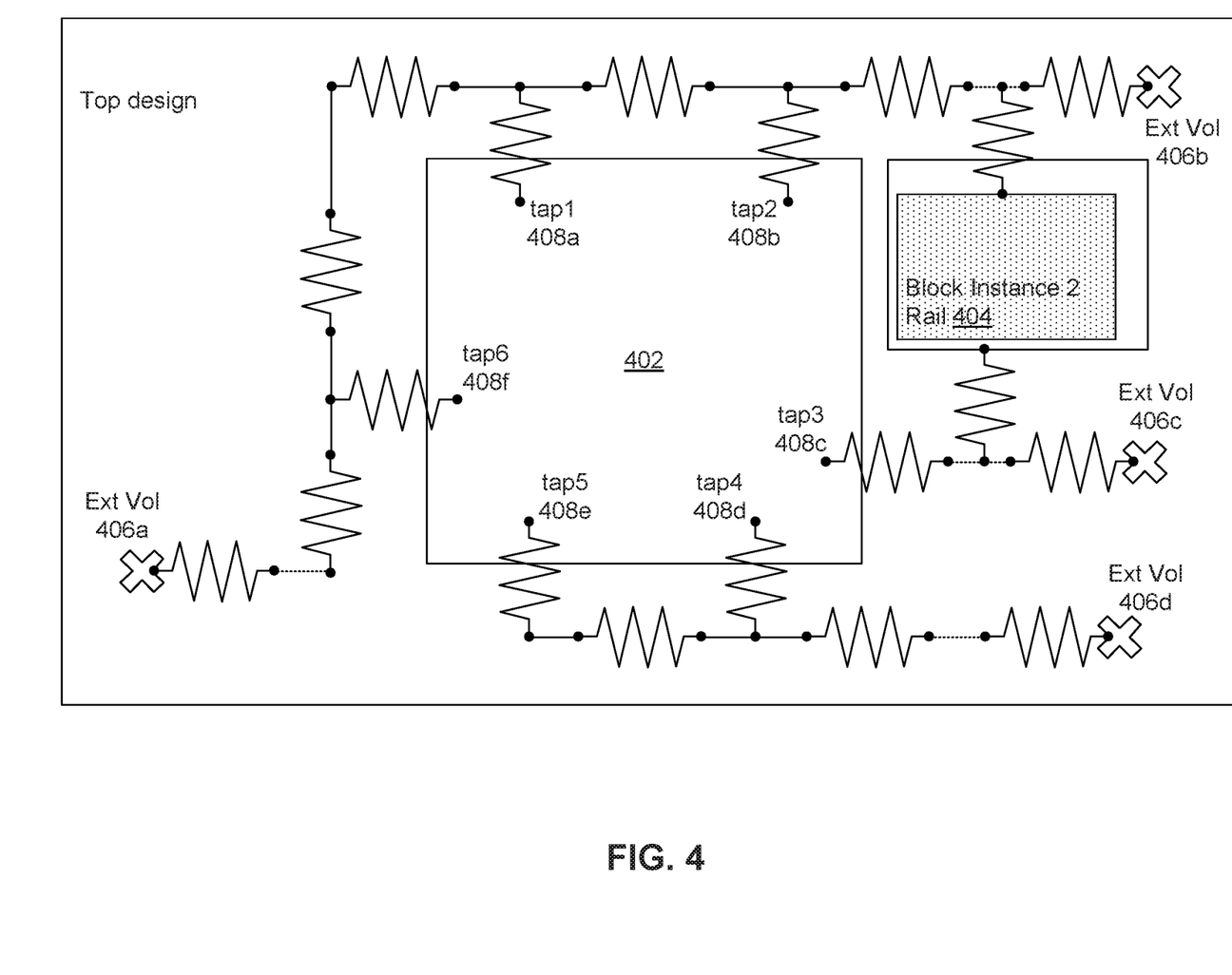
FIG. 4 illustrates circumstance outside a block where a physical context model of a block instance is to be extracted, according to an exemplary aspect of the present disclosure.

FIG. 4 illustrates circumstance outside a block where a physical context model of a block instance is to be extracted, according to an exemplary aspect of the present disclosure. FIG. 4 shows a first instance of a block block-instance-1 402 and a second instance of the block block-instance-2 404, from one or more external voltage source, for example, 406a, 406b, 406c, and 406d. Tap locations 408a-408f are shown, which, as described above, are used to connect the one or more external voltage sources 406a, 406b, 406c, and 406d, and the block-instance-1 402 in the block-level IR drop analysis. Since path distance from the one or more external voltage sources 406a, 406b, 406c, and 406d to each tap location of the tap locations 408a-408f may be different, the resistance value for each path may be different, and the voltage drop from the voltage at the one or more external voltage sources 406a, 406b, 406c, and 406d at each tap location may be different. Accordingly, the voltage at the top locations may not be as expected as ideal voltage. During IR drop analysis, voltage drop is calculated for all shapes of the supply net. Whether or not the tap location has ideal voltage has big impact on the voltage drop calculation. Non-ideal voltage on tap location will produce expected pessimistic result, while ideal voltage on tap locations will produce optimistic result.

Figure 5:
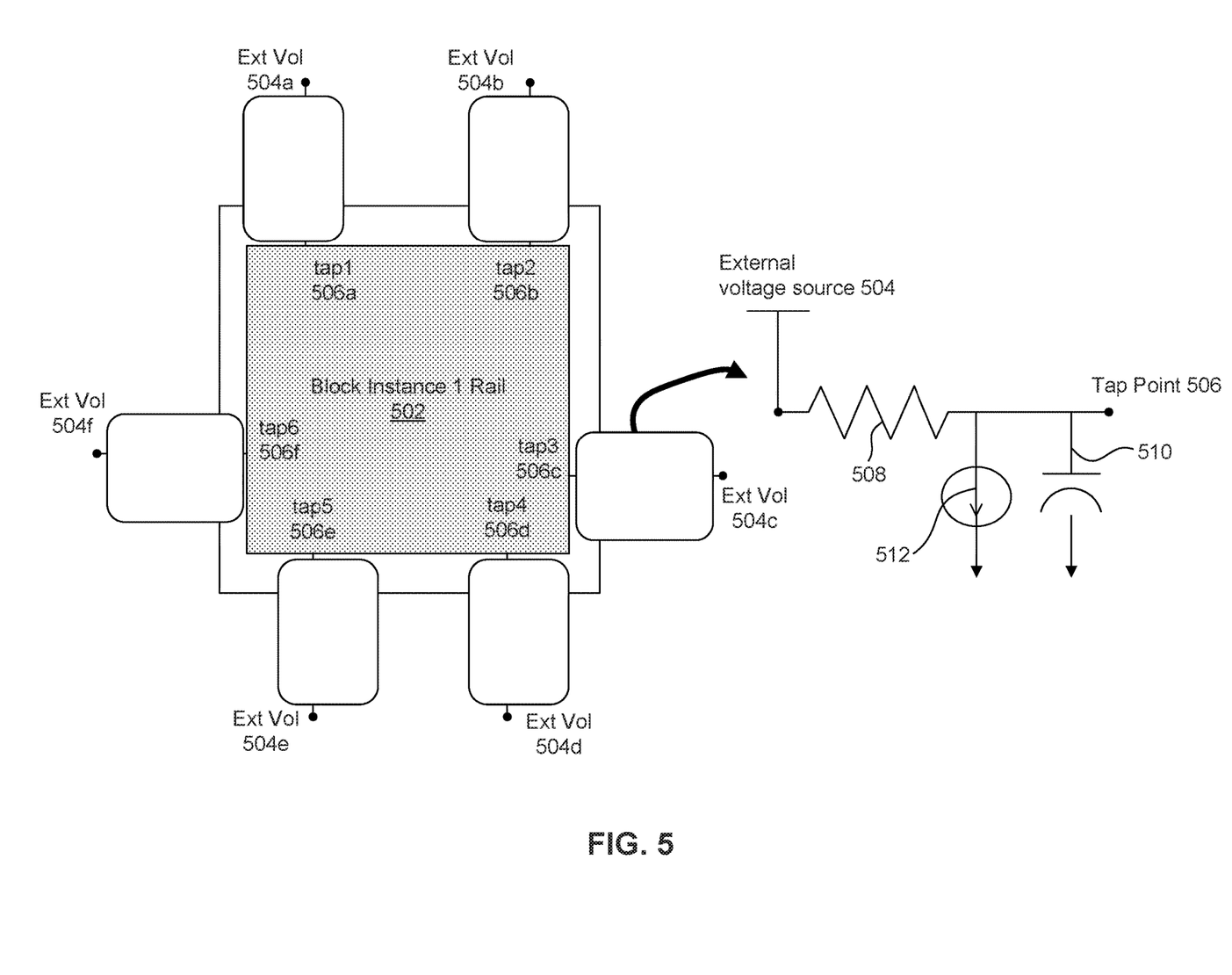
FIG. 5 illustrates an electrical context structure of a block context model, according to an exemplary aspect of the present disclosure.

FIG. 5 illustrates an electrical context structure of a block context model, according to an exemplary aspect of the present disclosure. The electrical context of the block may include effective resistance, capacitance, and a current source. In FIG. 5, a first instance of a block block-instance-1 502 is shown with tap locations 506a-506f for receiving power from external voltage sources 504a-504f. A path from the external voltage source to the tap location may include resistance 508, capacitance 510, and a current source 512 as the electrical context corresponding to the tap location of the block-instance-1 502. The electrical context may be computed or generated, in which the effective resistance can be calculated by the general method that puts a unit current at the tap point to solve the equivalent resistance based on the full-chip resistance network without the resistance network of the specified block instance. The effective electrical current may be calculated by the IR drop of the tap location and the effective resistance. After the dynamic IR drop, the capacitance of each node of the full-chip power delivery network may be analyzed. The effective capacitance can be obtained by the sum of all capacitance of the nodes in the specified region near each tap point.

Figure 6:
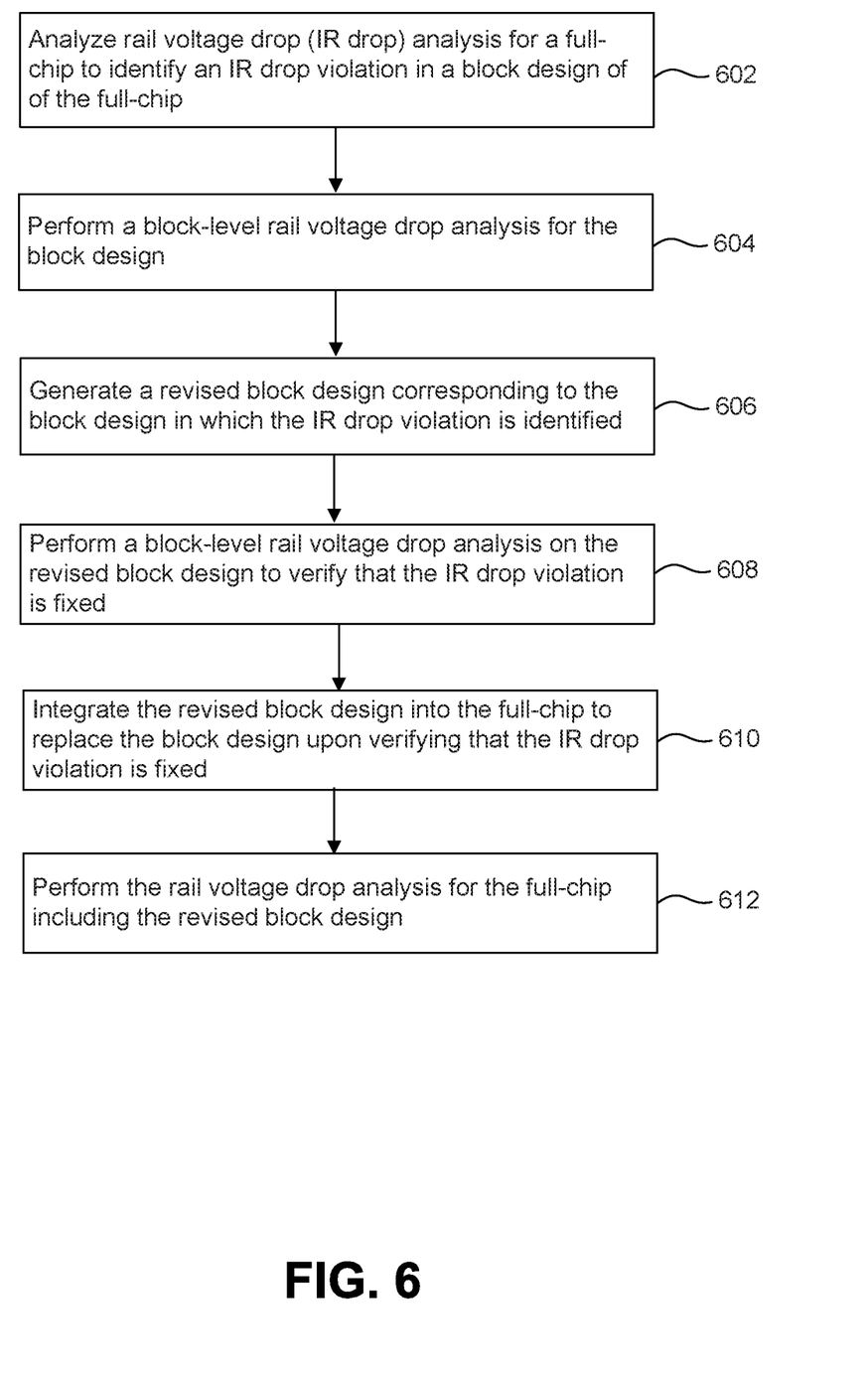
FIG. 6 illustrates a flowchart of the IR-drop fixing flow, according to an exemplary aspect of the present disclosure.

FIG. 6 illustrates a flowchart of the IR-drop fixing flow, according to an exemplary aspect of the present disclosure. As shown in FIG. 6, at step 602, rail voltage drop (IR drop)

for a full-chip may be analyzed to identify an IR drop violation of a plurality of IR drop violations in a block design of a plurality of block designs of the full-chip. As described above, the full-chip may include one or more block designs. The full-chip may be a VLSI circuit and may be a large VLSI circuit depending on the number of block designs. As described above, the rail voltage drop analysis for the full-chip is a lengthy and costly process.

At step 604, a block-level rail voltage drop analysis for the block design may be performed. The IR drop violation is a power integrity violation. The power integrity violation is a voltage and current operating conditions outside the specified voltage and current specification for the block design. The block-level rail voltage drop analysis is described in detail above and, therefore, is not repeated again. At step 606, a revised block design may be generated corresponding to the block design which the IR drop violation is identified. The revised block design is generated as the designer fixes the identified IR drop violation. At step 608, a block-level rail voltage drop analysis may be performed on the revised block design to verify that the IR drop violation is fixed.

At step 610, the revised block design may be integrated into the full-chip to replace the block design upon verifying that the IR drop violation is fixed. The IR drop violation in the revised block design is fixed by executing steps 606 and 608 one or more times. Thus as described above, instead of integrating the fixed block design into the full-chip and verifying the IR drop violation is fixed based on the full-chip rail voltage drop analysis, the fix of the IR drop violation is verified using the block-level rail voltage drop analysis. At step 612, rail voltage drop analysis may be performed for the full-chip that includes the revised block design. The rail voltage drop analysis for the full-chip may be performed to verify that IR drop violations in the full-chip are fixed and/or to identify new IR drop violations.

Figure 7:
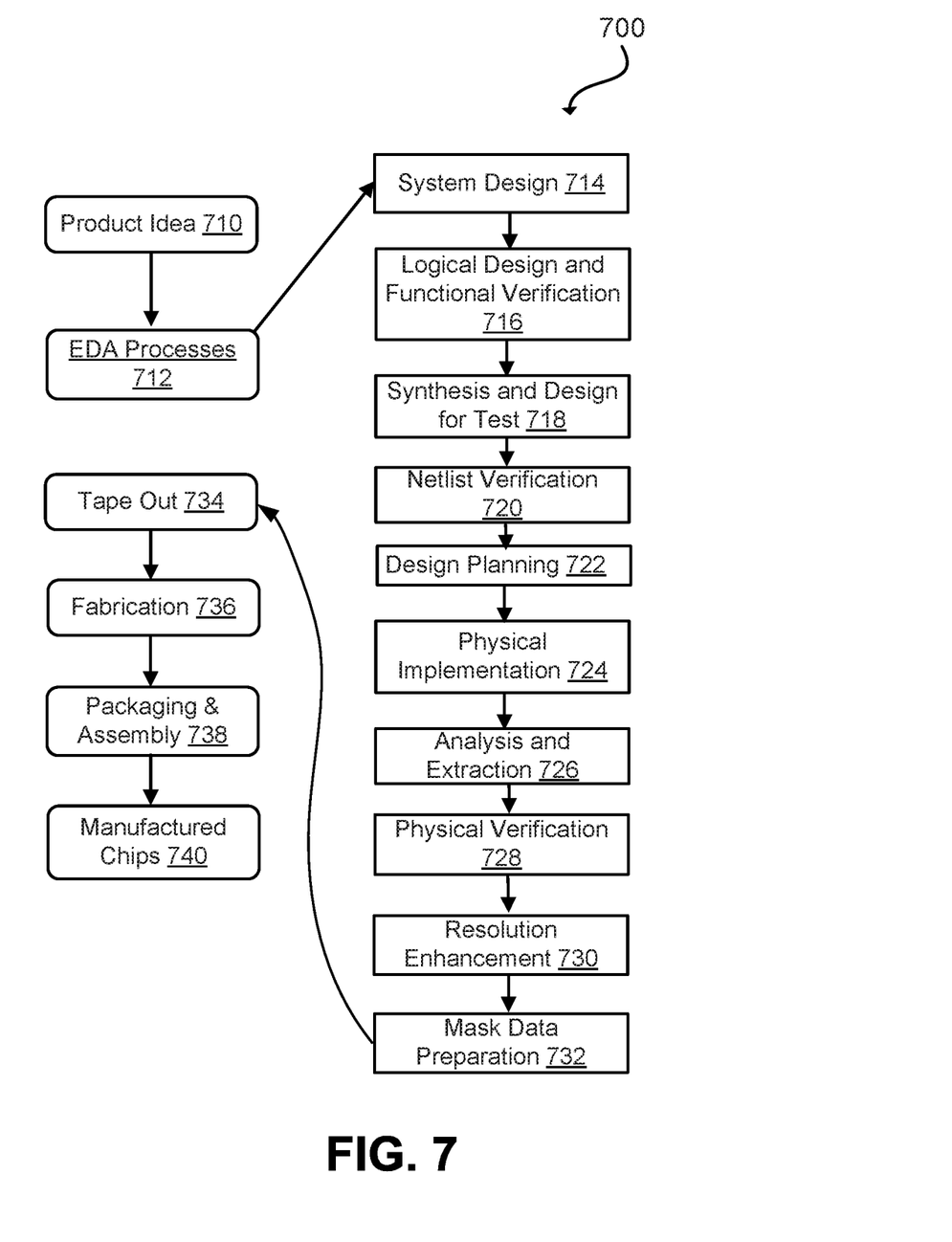
FIG. 7 illustrates a flowchart of various processes used during the design and fabrication of an integrated circuit, according to an exemplary aspect of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information that is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736, and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by being enabled by EDA products (or tools).

During system design 714, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 716, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 718, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for the production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for the development of cells for the library and for the physical and logical design that use the library.

Figure 8:
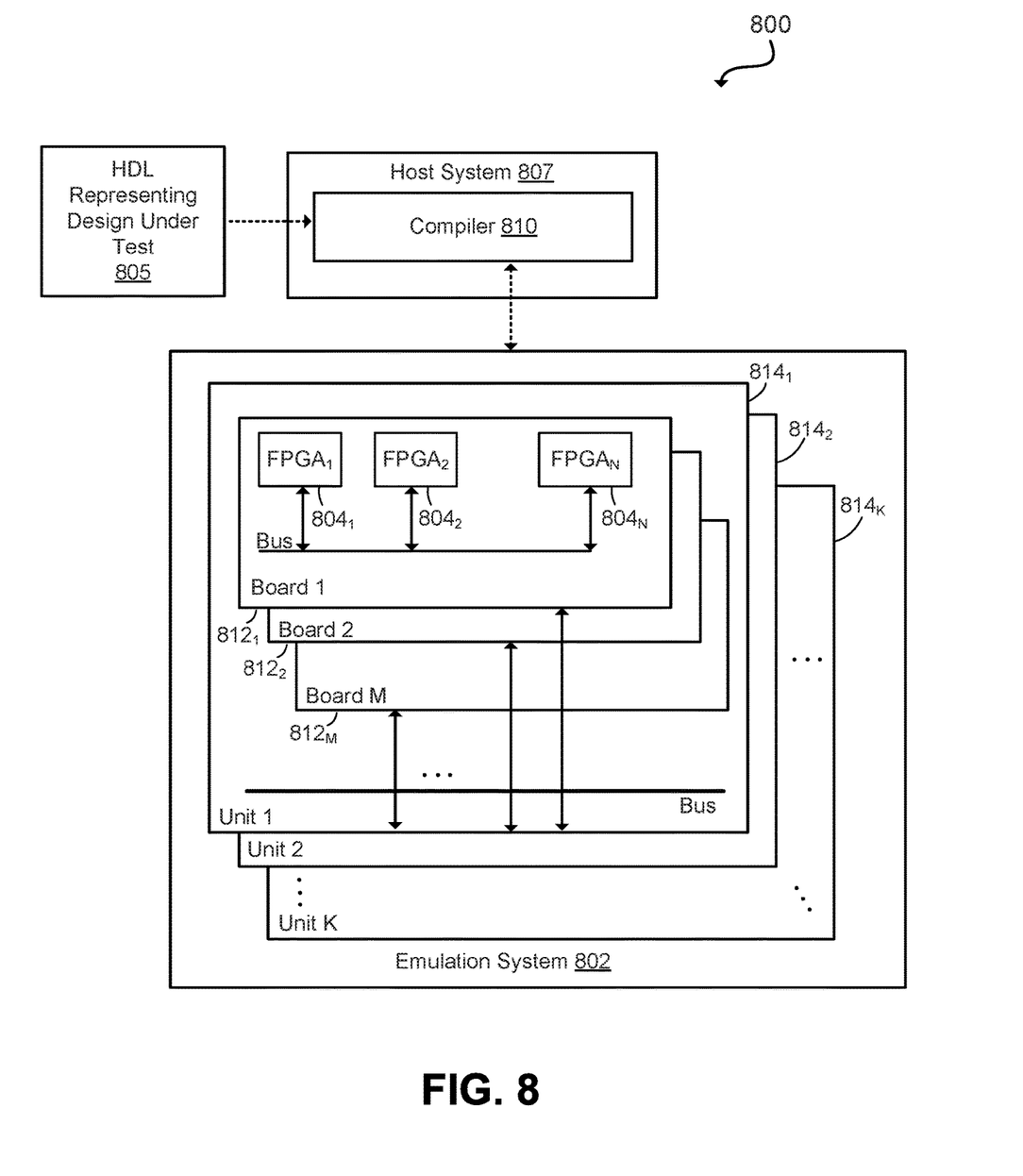
FIG. 8 illustrates an abstract diagram of an example emulation system, according to an exemplary aspect of the present disclosure.

FIG. 8 depicts an abstract diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. Circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs 8041 and 8042, as well as additional FPGAs to 804N. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 8041-804N may be placed onto one or more boards 8121 and 8122 as well as additional boards through 812m. Multiple boards can be placed into an emulation unit 8141. The boards within an emulation unit can be connected using the backplane of the emulation unit or any other types of connections. In addition, multiple emulation units (e.g., 8141 and 8142 through 814k) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate-level netlist using the DUT description. A host system can use the netlist of the DUT to partition the DUT into multiple partitions, where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT, which includes interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In the case of multiple re-emulations of an FPGA, merging the results produces a full debug view.

The host system receives, from the emulation system, signals traced by the logic of the identified FPGAs during the re-emulation of the component. The host system stores the signals received from the emulator. The signals traced during the re-emulation can have a higher sampling rate than the sampling rate during the initial emulation. For example, in the initial emulation, a traced signal can include a saved state of the component every X milliseconds. However, in the re-emulation, the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterward, the circuit designer can request to re-emulate the same component for a different time period or to re-emulate another component.

A host system 807 and/or the compiler 810 may include subsystems such as, but not limited to, a design synthesizer sub-system, a mapping sub-system, a run time sub-system, a results sub-system, a debug sub-system, a waveform sub-system, and a storage sub-system. The sub-systems can be structured and enabled as an individual or multiple modules, or two or more may be structured as a module. Together these sub-systems structure the emulator and monitor the emulation results.

The design synthesizer sub-system transforms the HDL that is representing a DUT 805 into gate-level logic. For a DUT that is to be emulated, the design synthesizer sub-system receives a description of the DUT. If the description of the DUT is fully or partially in HDL (e.g., RTL or another level of abstraction), the design synthesizer sub-system synthesizes the HDL of the DUT to create a gate-level netlist with a description of the DUT in terms of gate-level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate-level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), a signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states, and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that is associated with the time period.

The debug sub-system transmits the retrieved interface signals to the emulator. The debug sub-system instructs the debug sub-system to use the identified FPGAs and for the trace and injection logic of each identified FPGA to inject its respective traced signals into the logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to use all the cycles collectively.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 9:
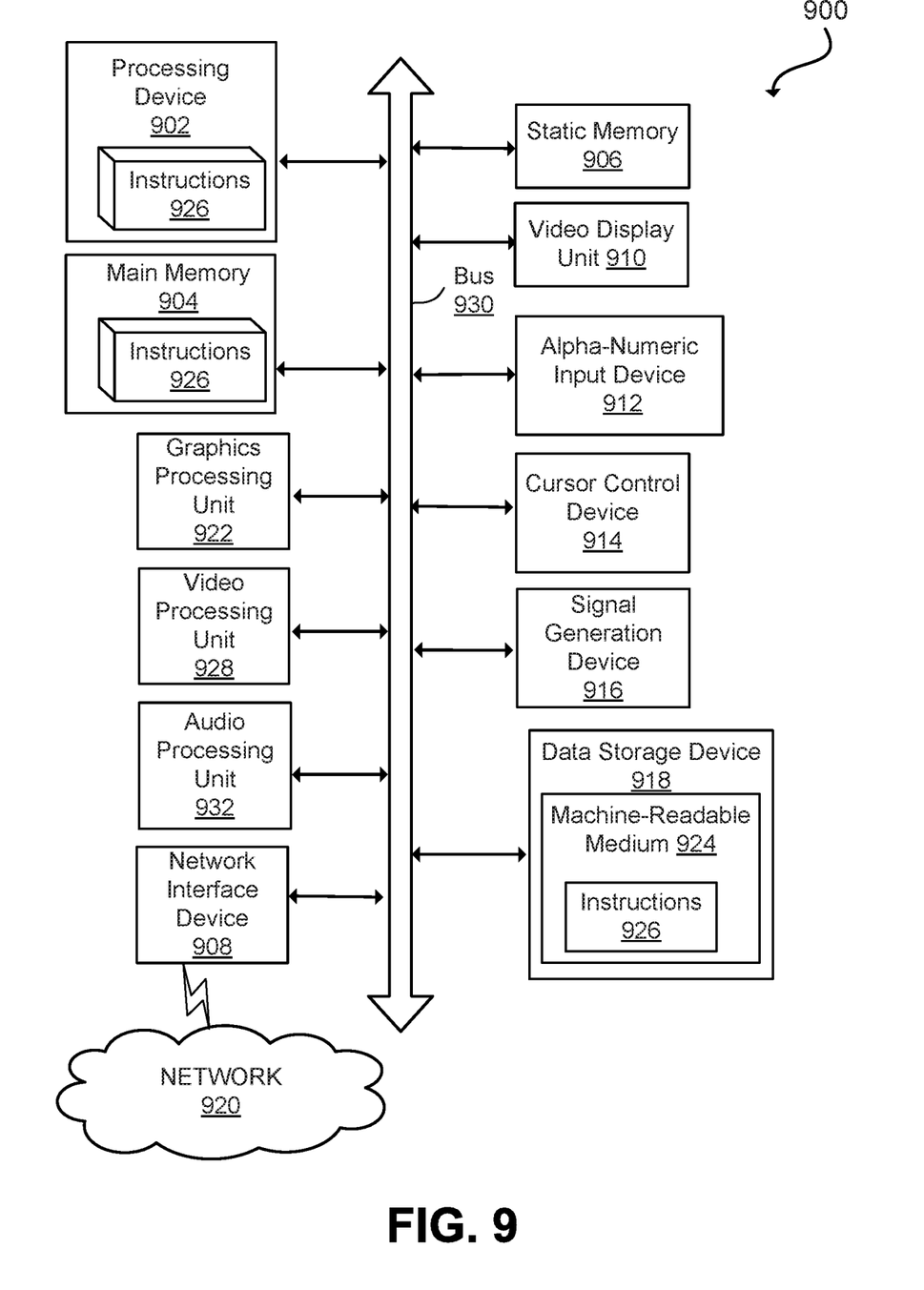
FIG. 9 illustrates an abstract diagram of an example computer system in which aspects of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

The processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 902 may also be one or more special-purpose processing devices such as an application-specific integrated circuit (ASIC), a field-programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 1132.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904, and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed:

1. A system, comprising:
   a memory; and
   a processor to execute instructions stored in the memory to perform operations comprising:
   analyzing rail voltage drop (IR drop) for a full-chip to identify an IR drop violation in a block design of the full-chip;
   performing a block-level IR drop analysis for the block design;
   generating a revised block design corresponding to the block design in which the IR drop violation is identified;
   performing a block-level IR drop analysis on the revised block design to verify that the IR drop violation is fixed;
   integrating the revised block design into the full-chip to replace the block design upon verifying that the IR drop violation is fixed; and
   performing the IR drop analysis for the full-chip comprising the revised block design.

2. The system of claim 1, wherein for performing the block-level IR drop analysis, the operations further comprise:
   creating a block-context corresponding to the block design.

3. The system of claim 2, wherein the operations further comprise:
   performing the block-level IR drop analysis for one or more times for the revised block design in association with the block-context corresponding to the block design.

4. The system of claim 2, wherein for creating the block-context, the operations further comprise:
   identifying one or more tap locations providing power from one or more voltage sources to the block design;
   calculating effective resistance value for each tap location inside the block design using a resistive network outside the block design where the one or more voltage sources are connected; and
   based on the calculated effective resistance value for each tap location, calculating effective current flow and effective capacitance.

5. The system of claim 2, wherein the operations further comprise:
   identifying a region across a boundary between the block design and a parent block design of the block design, wherein the parent block design comprises the block design.

6. The system of claim 5, wherein the region is a two-dimensional region on a layer of the block design.

7. The system of claim 1, wherein the analyzing the IR drop for the full-chip includes identifying an additional IR drop violation in an additional block design of the full-chip, wherein the operations further comprise:
   performing a block-level IR drop analysis for the additional block design;
   generating an additional revised block design corresponding to the additional block design in which the additional IR drop violation is identified;
   performing a block-level IR drop analysis on the additional revised block design to verify that the additional IR drop violation is fixed; and
   integrating the additional revised block design into the full-chip to replace the additional block design upon verifying that the additional IR drop violation is fixed.

8. A method, comprising:
   analyzing rail voltage drop (IR drop) for a full-chip to identify an IR drop violation in a block design of the full-chip;
   performing a block-level IR drop analysis for the block design;
   generating a revised block design corresponding to the block design in which the IR drop violation is identified;
   performing a block-level IR drop analysis on the revised block design to verify that the IR drop violation is fixed;
   integrating the revised block design into the full-chip to replace the block design upon verifying that the IR drop violation is fixed; and
   performing the IR drop analysis for the full-chip comprising the revised block design.

9. The method of claim 8, wherein performing the block-level IR drop analysis comprises:
   creating a block-context corresponding to the block design.

10. The method of claim 9, further comprising:
    performing the block-level IR drop analysis for one or more times for the revised block design in association with the block-context corresponding to the block design.

11. The method of claim 9, wherein creating the block-context comprises:
    identifying one or more tap locations providing power from one or more voltage sources to the block design;
    calculating effective resistance value for each tap location inside the block design using a resistive network outside the block design where the one or more voltage sources are connected; and
    based on the calculated effective resistance value for each tap location, calculating effective current flow and effective capacitance.

12. The method of claim 9, further comprising:
    identifying a region across a boundary between the block design and a parent block design of the block design, wherein the parent block design comprises the block design.

13. The method of claim 12, wherein the region is a two-dimensional region on a layer of the block design.

14. The method of claim 8, wherein the analyzing the IR drop for the full-chip includes identifying an additional IR drop violation in an additional block design of the full-chip, and wherein the method further comprises:
    performing a block-level IR drop analysis for the additional block design;
    generating an additional revised block design corresponding to the additional block design in which the additional IR drop violation is identified;
    performing a block-level IR drop analysis on the additional revised block design to verify that the additional IR drop violation is fixed; and
    integrating the additional revised block design into the full-chip to replace the additional block design upon verifying that the additional IR drop violation is fixed.

15. A non-transitory, tangible computer-readable media having instructions stored thereon that, when executed by at least one computing device, cause the at least one computing device to perform operations comprising:
    analyzing rail voltage drop (IR drop) for a full-chip to identify an IR drop violation in a block design of the full-chip;
    performing a block-level IR drop analysis for the block design;
    generating a revised block design corresponding to the block design in which the IR drop violation is identified;
    performing a block-level IR drop analysis on the revised block design to verify that the IR drop violation is fixed;
    integrating the revised block design into the full-chip to replace the block design upon verifying that the IR violation is fixed; and
    performing the IR drop analysis for the full-chip comprising the revised block design.

16. The non-transitory, tangible computer-readable media of claim 15, wherein for performing the block-level IR analysis, the operations further comprise:
    creating a block-context corresponding to the block design.

17. The non-transitory, tangible computer-readable media of claim 16, wherein the operations further comprise:
    performing IR drop analysis for one or more times for the revised block design in association with the block-context corresponding to the block design.

18. The non-transitory, tangible computer-readable media of claim 16, wherein for creating the block-context, the operations further comprise:
    identifying one or more tap locations providing power from one or more voltage sources to the block design;
    calculating effective resistance value for each tap location inside the block design using a resistive network outside the block design where the one or more voltage sources are connected; and
    based on the calculated effective resistance value for each tap location, calculating effective current flow and effective capacitance.

19. The non-transitory, tangible computer-readable media of claim 16, wherein the operations further comprise:
    identifying a region across a boundary between the block design and a parent block design of the block design, wherein the parent block design comprises the block design,
    wherein the region is a two-dimensional region on a layer of the block design.

20. The non-transitory, tangible computer-readable media of claim 16, wherein the analyzing the IR drop for the full-chip includes identifying an additional IR drop violation in an additional block design of the full-chip, wherein the operations further comprise:
- performing a block-level IR drop analysis for the additional block design;
- generating an additional revised block design corresponding to the additional block design in which the additional IR drop violation is identified;
- performing a block-level IR drop analysis on the additional revised block design to verify that the additional IR drop violation is fixed; and
- integrating the additional revised block design into the full-chip to replace the additional block design upon verifying that the additional IR drop violation is fixed.

* * * * *